Figure 3:
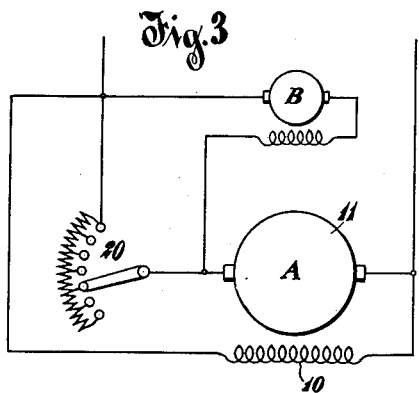

B. FRANKENFIELD.
SYSTEM OF MOTOR CONTROL.
APPLICATION FILED JAN. 31, 1907.
1,017,257.
Patented Feb. 13, 1912.
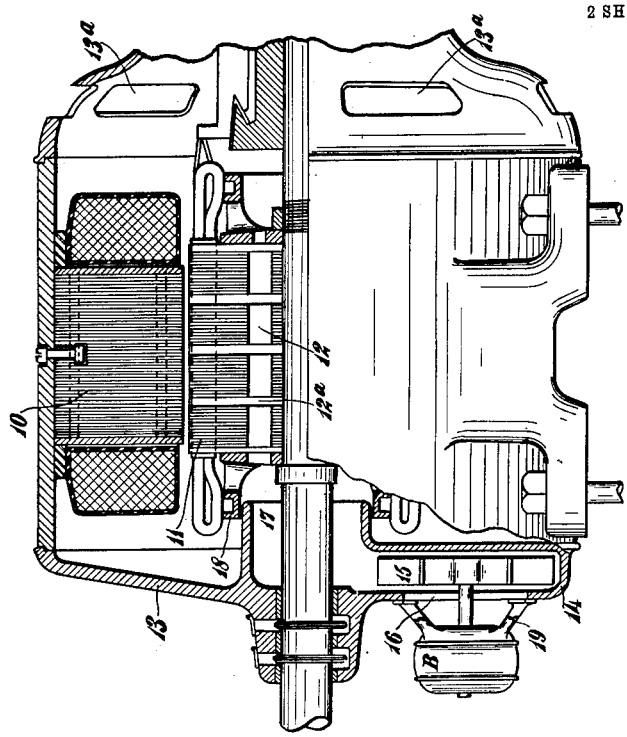
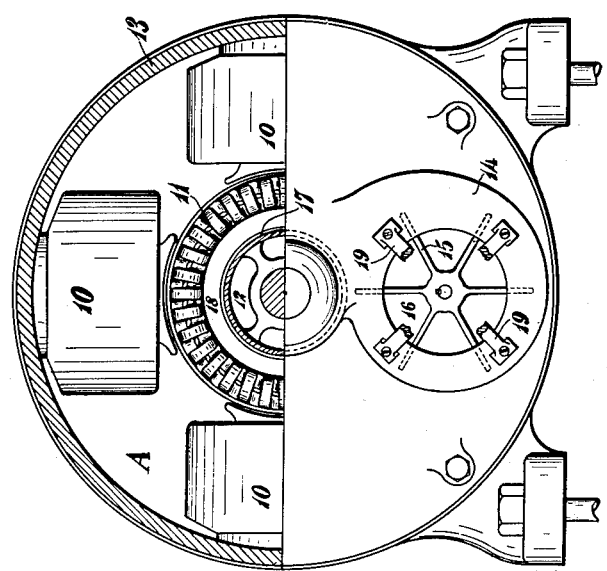
Witnesses
Oliver W. Sharman
Fred J. Kinsey
Inventor
Budd Frankenfield
By
Chas. E. Lord
Attorney

B. FRANKENFIELD.
SYSTEM OF MOTOR CONTROL.
APPLICATION FILED JAN. 31, 1907.

1,017,257.

Patented Feb. 13, 1912.

2 SHEETS—SHEET 2.

Witnesses
Oliver J. Sharman
Fred J. Kinsey

Inventor
Budd Frankenfield
By Chas. E. Lord
Attorney

UNITED STATES PATENT OFFICE.

BUDD FRANKENFIELD, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

SYSTEM OF MOTOR CONTROL.

1,017,257.  Specification of Letters Patent.  Patented Feb. 13, 1912.

Application filed January 31, 1907. Serial No. 354,969.

*To all whom it may concern:*

Be it known that I, BUDD FRANKENFIELD, citizen of the United States, residing at Norwood, in the county of Hamilton and State of Ohio, have invented certain new and useful Improvements in Systems of Motor Control, of which the following is a full, clear, and exact specification.

My invention relates to systems of motor control, especially in connection with motor ventilating arrangements.

In dynamo-electric machines, especially motors which vary in speed, it is often difficult to obtain sufficient ventilation at the low speeds because the ventilation varies with the speed. Thus it often happens that machines which keep sufficiently cool at the higher speeds, heat up excessively at the lower speeds because of the diminished ventilating effect.

It is the object of my present invention to provide a ventilating system for dynamo-electric machines in which undue rises in temperature are prevented at all speeds.

With this object in view I have devised a system in which there is a main dynamo-electric machine and a small motor arranged to vary in speed inversely, the small motor being arranged to assist in circulating a cooling fluid through the main dynamo-electric machine.

The novel features in my invention will be best understood from the description and drawings and will be particularly pointed out in the claims.

In the drawings, Figure 1 is a partially sectional end view of a motor embodying my invention, the auxiliary motor being removed for the sake of clearness. Fig. 2 is a side elevation of the same with some of the parts in section; and Figs. 3 to 8 inclusive are diagrams showing different methods of connecting the main and auxiliary motors.

The main dynamo-electric machine A, comprising the field magnets or other stationary member 10 and the armature or other rotatable member 11, may be of any desired type. The armature core is here shown with ventilating openings 12 and 12ª, but any other scheme for conducting air or other cooling fluid through the armature may be used instead of the specific one here illustrated. If desired there may also be ventilating openings in or around the field construction.

The casing 13 of the machine A is made with a chamber 14 at one end, this chamber forming a housing for a centrifugal fan 15 driven by an auxiliary motor B. For the purpose of making the device entirely self-contained, the motor B is preferably supported from the motor casing 13, as by arms 19. The fan 15 when operating draws air into the chamber 14 through the opening 16 in the otherwise air-tight end of the casing 13, and discharges it through the tube 17 into the open space within the support 18 for the end-turns of the armature coils, through the ventilating openings 12 and 12ª in the armature core, through or around the field windings, whence it finally escapes through the openings 13ª in the casing 13. The armature 11 when rotating draws in air through the same channel and discharges it through the radial openings 12ª by centrifugal force. The inlet 16 may be connected to any desired source of air supply.

The motors A and B may be controlled in several different ways. In Fig. 3, the field 10 of the motor A is connected directly across the line, while the armature 11 is connected in series with a rheostat 20. The motor B is shown as a series motor in this figure and is connected across the terminals of the rheostat 20. It is not necessary that the motor B be series connected, however, other forms of motors being equally applicable.

In the operation of the device as connected in Fig. 3, the main switch for the motor A is closed with the rheostat 20 preferably in its off position. The motor B almost immediately attains full speed and drives the fan 15 to ventilate the motor A. Upon upward movement of the arm of the rheostat 20, operative current is supplied to the armature of motor A and the resistance in the circuit of said armature is decreased, thus causing said motor A to start and increase in speed. As the speed of motor A increases and the effective rheostat resistance decreases, the potential impressed upon the motor B is decreased and said motor is caused to slow down. The slowing down of the motor B decreases the speed of the fan 15 so that it will not act to force as much air into and through the armature 11, but by reason of its increased speed the latter draws in more air by its own movement and less air is needed from the fan 15. The motor B should be so designed that it will drive the fan 15 at the proper rate of speed at all times to supply the proper amount of assistance in circulating the air through the motor A to provide for the proper cooling of the latter. When the arm of the rheostat 20 reaches its upper position the armature 11 is connected directly across the circuit and is running at approximately full speed, while the motor B is short-circuited and at or approaching a standstill. As the arm of rheostat 20 is moved downward, the motor A is caused to decrease in speed while the motor B is started and driven at the proper speed to make up any deficiency in the amount of air required for proper ventilation of the machine A.

Figure 4:
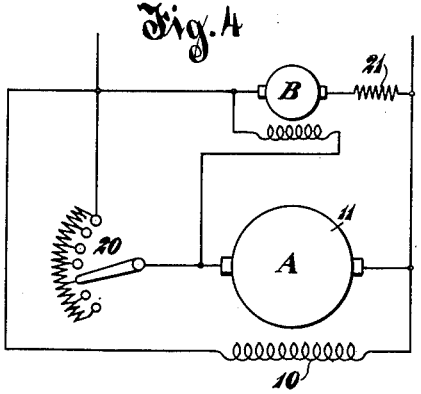

In Fig. 4 the motor A is controlled in the same manner as in Fig. 3. The motor B, however, is connected differently. The armature of the motor B is connected directly across the line in series with a high resistance 21, while the field winding of the motor B is connected across the rheostat 20 in the circuit of the main motor armature. Because of the resistance 21, the current in the armature of the motor B remains practically constant regardless of the field strength of said motor and the speed of the motor varies directly as its field strength. By moving the rheostat 20 to vary the speed of the motor A, the speed of the motor B is inversely varied and said motor is caused to assist more or less in the ventilation of the motor A as required.

Figure 5:
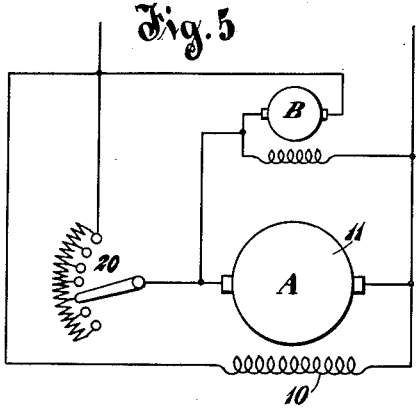

In Fig. 5, the motor A is controlled by a rheostat 20 in its armature circuit in the same manner as in Figs. 3 and 4. The motor B, however, has its armature connected across the rheostat 20 and its field winding across the armature 11. By moving the rheostat 20 to increase the speed of the motor A, the potential impressed upon the armature of the motor B is diminished and its field strength simultaneously increased, for both reasons decreasing the speed of the motor B. By an inverse process the speed of the motor B is increased when the rheostat 20 is moved to decrease the speed of the motor A.

Figure 6:
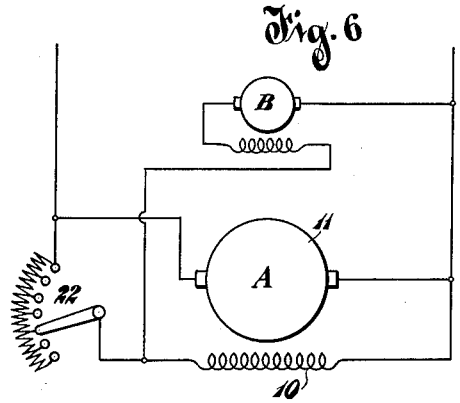

In Fig. 6, the motor B is connected across the main motor field winding 10, and the speed of the motor A regulated by a variable field resistance 22. Upon increasing the amount of the resistance 22 in circuit with the field winding 10, the motor A is caused to increase in speed because of its diminished field strength, and the motor B to decrease in speed because of the diminished voltage impressed thereon. Inversely, upon decreasing the effective part of the resistance 22, the motor A is caused to decrease and the motor B to increase in speed.

Figure 7:
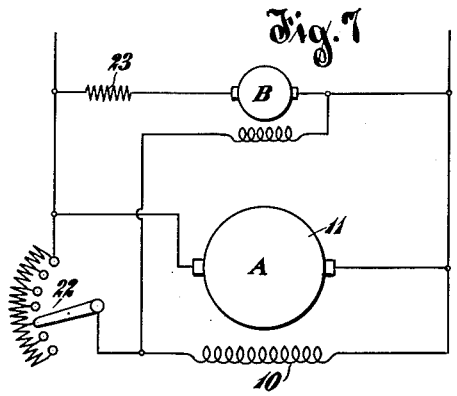

In Fig. 7, the speed of the motor A is controlled by a field resistance 22 in the same manner as in Fig. 6. The motor B, however, is differently connected. The armature of the auxiliary motor is connected directly across the line and has in series therewith a high resistance 23 similar to the resistance 21 of Fig. 4. The armature of the motor B therefore carries a substantially constant current. The field of the motor B is connected across the field 10 of the main motor and therefore the speed of the motor B varies directly as the strength of said latter field and inversely as the speed of the motor A.

Figure 8:
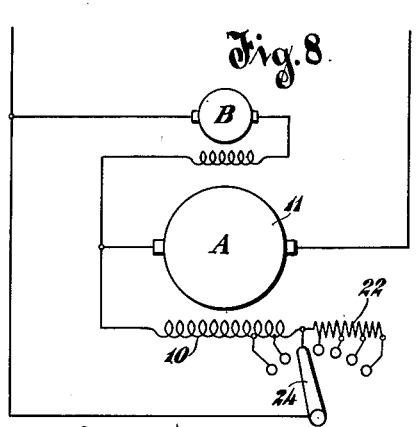

In Fig. 8 is shown a system of connections in which the main motor A is series connected. The speed of the main motor A is arranged to be varied by moving an arm 24 to cut in or out sections of the field resistance 22 and the field winding 10 successively, thus varying both the field strength of said motor and the resistance in circuit with the motor armature. As the arm 24 is moved to the left, the motor B, which is connected across the effective part of the field winding and resistance, has a lower potential impressed thereon, and decreases in speed as the speed of the motor A increases. By an inverse process the speed of the motor B increases as that of the motor A decreases.

The term "varies inversely as" is not intended to be limited in this specification to exact mathematical inverse proportion, but instead includes any increase in one and decrease in the other of the things specified. Similarly, the term "varies directly as" is not limited to exact mathematical proportion.

In all the systems of connections which I have here shown, the main dynamo-electric machine A is described as a motor, but my invention is not limited to such application. If desired, the auxiliary motor B together with its fan 15 may be placed at a distance from the main motor A instead of being built into or attached to its casing. Other than centrifugal fans could be used, and other cooling fluids besides air under atmospheric conditions. Moreover the systems of control set forth may be applied for other purposes than ventilating the main dynamo-electric machine.

Other changes may be made in the precise arrangements and connections here shown and described and all such which do not depart from the spirit and scope of my invention I aim to cover in the following claims.

What I claim as new is:—

1. The method of ventilating an electric motor, which consists in producing part of the ventilation by its own rotation and part from an auxiliary source, and varying said parts inversely.

2. In combination, a main electric motor, ventilating means driven thereby, an auxiliary electric motor, ventilating means driven thereby, and means for varying the speeds of said motors inversely.

3. In combination, a dynamo-electric machine which ventilates itself by its own rotation, an auxiliary dynamo-electric machine, a fan driven by said auxiliary machine and assisting the ventilation of the main dynamo-electric machine, and means for varying the speeds of the two machines inversely.

4. In combination, a variable speed main dynamo-electric machine which ventilates itself by its own rotation, an auxiliary motor, a fan driven by said motor and assisting in the ventilation of said main motor, and connections for said auxiliary motor for causing the speed thereof to vary inversely to the speed of said main motor.

5. In combination, a dynamo-electric machine which circulates a cooling fluid through itself by its own rotation, auxiliary means for assisting the circulation of said fluid, and means for varying the amount of assistance given by said auxiliary means inversely to the amount of circulation caused by the rotation of the main dynamo-electric machine.

In testimony whereof I affix my signature, in the presence of two witnesses.

BUDD FRANKENFIELD.

Witnesses:
  Geo. B. Schley,
  Fred J. Kinsey.